(12) United States Patent
Cunningham et al.

(10) Patent No.: US 7,497,781 B2
(45) Date of Patent: Mar. 3, 2009

(54) VARIABLE STIFFNESS FLEXIBLE JOINT

(75) Inventors: John Cunningham, Saratoga Springs, NY (US); Robert E. Roemer, Bolton, MA (US); Robert C. Banasik, Columbus, OH (US)

(73) Assignee: Seicon, Ltd., Columbus, OH (US)

( * ) Notice: Subject to any disclaimer, the term of this patent is extended or adjusted under 35 U.S.C. 154(b) by 0 days.

(21) Appl. No.: 11/280,944

(22) Filed: Nov. 16, 2005

(65) Prior Publication Data

US 2006/0194635 A1 Aug. 31, 2006

Related U.S. Application Data

(60) Provisional application No. 60/628,344, filed on Nov. 16, 2004.

(51) Int. Cl.
*F16D 3/58* (2006.01)

(52) U.S. Cl. .................................. 464/86; 464/137

(58) Field of Classification Search .................. 464/23, 464/71, 86, 97, 137, 50, 99, 138, 81, 85
See application file for complete search history.

(56) References Cited

U.S. PATENT DOCUMENTS

| | | | | |
|---|---|---|---|---|
| 1,190,323 A | * | 7/1916 | Robert | ............... 464/50 |
| 1,223,951 A | * | 4/1917 | Francke | ............... 464/81 |
| 1,707,530 A | * | 4/1929 | Meseroll | ............ 464/138 X |
| 1,821,215 A | * | 9/1931 | Hahn | ............ 464/138 |
| 4,214,458 A | * | 7/1980 | Philleo | ............... 464/85 |
| 5,415,587 A | | 5/1995 | Fenley | ............... 464/71 |

* cited by examiner

*Primary Examiner*—Greg Binda
(74) *Attorney, Agent, or Firm*—Porter, Wright, Marris & Arthur, LLP

(57) ABSTRACT

A structure that positions rotating shafts and allows continuing transmission of rotary motion between shafts or shaft segments that are not aligned with one another or that may from time to time become misaligned. The invention reduces the undesirable effect of torque or torsional transients on rotary positioning and continued transmission of rotary motion, as well as reducing vibration resulting from linear or other angular displacement on either side of the joint. The structure comprises opposing outer and inner plates, each engaging a corresponding shaft or shaft segment. The plates define a plurality of holes that support flexible members. The flexible members extend through the plates on adjacent shafts or shaft segments around the shaft ends. Torque may be transmitted from one shaft to another by the flexible members.

20 Claims, 5 Drawing Sheets

VARIABLE STIFFNESS FLEXIBLE JOINT

CROSS-REFERENCE TO RELATED APPLICATIONS

This application claims the benefit of U.S. provisional patent application No. 60/628,344, filed Nov. 16, 2004.

STATEMENT REGARDING FEDERALLY SPONSORED RESEARCH

Not applicable

REFERENCE TO MICROFICHE APPENDIX

Not applicable

FIELD OF THE INVENTION

This invention relates to supports and, more specifically, to supports, clamps, and mounting and positioning devices for rotating shafts. This invention may be useful, for example, in supporting rotating shafts, positioning interconnected rotating components, and transmitting power or rotation from one shaft to another.

BACKGROUND OF THE INVENTION

Supports and related structures that support for rotating shafts may be subject to forces that cause unwanted or damaging movement or vibration of the systems. The forces associated with the rotating shafts also may cause unwanted or damaging movement or vibration of the structures that support the shafts and retain them in position. The content of our copending U.S. patent application Ser. No. 10/348,036 is incorporated herein by reference.

When it is desired to transmit torque from one rotating shaft or shaft segment to another, adjacent shafts or shaft segments may be displaced from one another laterally, angularly, or a combination of these. Such displacements may reduce or even interrupt the desired transmission of rotary motion from one shaft or shaft segment to another.

Conventional joints designed for high torsional loads include "universal" joints, such as the "U-joint" on an automobile driveshaft that accommodates the angularity of the driven wheel assembly with respect to the vehicle transmission. Such universal joints typically are passive compliant devices that will not naturally return to an undistorted condition. Another example is the conventional mechanic's universal joint that permits driving of sockets in congested areas inaccessible by a straight shaft. A major disadvantage of the mechanic's universal joint is that the "limp" universal joint allows the socket to be positioned on the bolt or nut only when a user is able to position the end of the assembly by hand, which can be very difficult in congested areas.

SUMMARY OF THE INVENTION

The present invention provides a structure for supporting a rotating shaft and transmitting rotary motion from one shaft to an adjacent shaft, regardless of lateral or angular displacement of the shaft ends. The inherent stiffness of the joint, which tends to spring back into an undeformed condition, may facilitate easier positioning of the shafts than conventional (e.g., universal) joints.

The variable stiffness characteristics of the present invention also allow positioning a component that requires rotating adjustment, such as a steering column, to reduce intershaft and support vibration. Such vibration may cause positioning error at certain resonant frequencies or displacement conditions or undesirably large loads on shafting or components (which in turn may result in excessive wear, failure, or unnecessarily conservative design of shafting or components to avoid excessive or failure).

In one preferred embodiment, the invention provides a structure for linking rotatable shafts. The structure comprises first and second shaft end assemblies and a plurality of flexible members. The shaft end assemblies each comprise opposing outer and inner plates, with the plates in each assembly defining a central bore for receiving a corresponding shaft end and a plurality of holes for supporting the flexible members. The flexible members extend from the plates of the first shaft end assembly to the plates of the second shaft end assembly around the ends of the shafts to be linked. The stiffness of the link between the shaft ends may be varied by providing flexible members of a different composition, providing flexible members of a different dimension, changing the distance between the outer and inner plates on a shaft end assembly, changing the distance between the first and second shaft end assemblies, or a combination of these.

In another preferred embodiment, the stiffness of the link between the shaft ends may be varied while the structure is in place on the shaft ends, allowing adjustment of the stiffness to be made while the shafts are rotating. In this embodiment, the stiffness may be varied by changing the distance between the outer and inner plates on a shaft end assembly, changing the distance between the first and second shaft end assemblies, or a combination of these. The structure also may comprise an automated system for monitoring the stiffness of the link, comparing it to a predetermined value, and adjusting the stiffness of the link in response to this comparison.

In yet another preferred embodiment, the flexible members transmit torque from one shaft end to the other when the shaft end assemblies are secured to the corresponding shaft ends. As described above, the stiffness of the structure may be varied by providing flexible members of a different composition, providing flexible members of a different dimension, changing the distance between the outer and inner plates on a shaft end assembly, changing the distance between the first and second shaft end assemblies, or a combination of these.

In still another preferred embodiment, at least one shaft end assemblies is reclosably divided into at least 2 lateral sections. This lateral division may facilitate placement of the shaft end assembly on the corresponding shaft end.

In another preferred embodiment, the invention provides a method of linking rotatable shafts, comprising the steps of providing first and second shaft end assemblies, each comprising opposing outer and inner plates defining a central bore for receiving a corresponding shaft end and a plurality of holes for supporting flexible members, providing a plurality of flexible members, placing the shaft end assemblies on corresponding shaft ends, and inserting the flexible members through the holes in the plates of the first and second shaft end assemblies around the shaft ends. The method also may comprise the step of varying the stiffness of the link between the shaft ends.

In yet another preferred embodiment, the step of varying the stiffness of the link may be accomplished providing flexible members of a different composition, providing flexible members of a different dimension, or a combination of these. Alternatively, the step of varying the stiffness of the link may be accomplished by changing the distance between the outer and inner plates on a shaft end assembly, changing the distance between the first and second shaft end assemblies, or a combination of these. This step may be carried out after the structure is in place on the shaft ends, i.e., after placing the shaft end assemblies on the corresponding shaft ends and inserting the flexible members through the holes in the plates. The preceding method also may comprise the step of providing an automated system for monitoring the stiffness of the link, comparing it to a predetermined value, and adjusting the stiffness of the link in response to this comparison.

In still another preferred embodiment, the method also may comprise the step of securing the shaft end assemblies to their corresponding shaft ends. This allows the flexible members to transmit torque from one rotating shaft to the other shaft.

In another preferred embodiment, the method also may comprise the step of reclosably dividing at least one shaft end assembly into at least 2 lateral sections, This may facilitate placing the shaft end assembly on the corresponding shaft end.

BRIEF DESCRIPTION OF THE DRAWINGS

These and further objects of the invention will become apparent from the following detailed description.

DETAILED DESCRIPTION OF CERTAIN PREFERRED EMBODIMENTS

The invention provides a structure that positions rotating shafts and transmits rotary motion between shafts or shaft segments that are not aligned with one another or that may from time to time become misaligned when continued transmission of rotary motion is desired. The invention reduces the undesirable effect of torque or torsional transients on rotary positioning and continued transmission of rotary motion.

In one embodiment of the invention, the structure supports the intersection of the two shaft segments via an articulated connection. This embodiment may be useful in applications in which the shaft segments intersect, but a differential angularity exists between the shaft axes.

In another embodiment of the invention, the structure supports nonintersecting shaft segments. This embodiment may be useful in application in which the shaft segments are misaligned both translationally (laterally offset) and rotationally (angularity).

Figure 1:
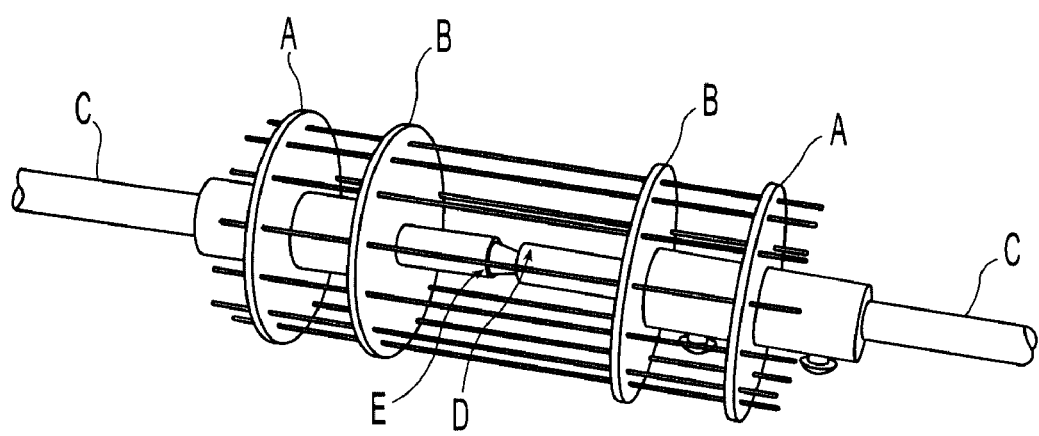
FIG. 1 depicts a structure of the present invention with an articulated connection in its undeformed position.

The structure, shown in FIG. 1, comprises first and second shaft end assemblies which support a plurality of unitary flexible members E. Each shaft end assembly comprises opposing outer A and inner B plates. The plates A, B in each assembly define a central bore for receiving a corresponding shaft end C and a plurality of holes for supporting the flexible members E, which extend through the plates A, B around the shaft ends C. The structure may transmit torque from one rotating shaft to the other shaft when the shaft end assemblies are secured to the shaft ends.

The outer plate A is spaced at a distance from the inner plate B. The shaft end assembly may include a spacer to maintain this separation. For example, the spacer may be a tubular member that extends from the inner plate at least to the outer plate, with the inner diameter of the tubular member sized to accommodate the shaft end. The spacer also may be a pair of telescoping tubes, as described more fully in our copending U.S. patent application Ser. No. 10/348,036, so that the distance between the inner B and outer A plates may be changed.

A shaft end C may be received within the bore provided in a pair of plates A, B, with the outer plate A positioned at or near the end of its respective shaft C. Each of the plates A, B is adjustable along the axis of the shaft C. The plates A, B may be fixed from rotating on their respective shafts C via set screws, sliding splines, or other methods known in the art that permit the transmission of torque between the support and the shaft.

As described in our copending U.S. patent application Ser. No. 10/348,036, the plates A, B and associated tubular member E may be divided laterally into two or more sections to facilitate installation and maintenance. These sections may, for example, comprise upper and lower half cylindrical sections. Those skilled in the art will recognize that other shaped sections that are not equal halves or are not portions of a cylinder also may be useful in the present invention. When the plates A, B and tubular members E are divided into upper and lower half-cylindrical sections, the sections may be secured by fastening the two half-cylinders together with any conventional fastening means including but not limited to screws, bolts, clamps, and straps. Divided plates and tubular members also may be secured using hinges and conventional fasteners, including but not limited to snap clamps, pipe clamps, bolts, and screws The outer A and inner B plates define a plurality of holes. The pattern of the holes in the outer plate A corresponds to the pattern of the holes in the inner plate B. In a preferred embodiment of the invention, the holes are arranged in a generally circular pattern a fixed distance from the central bore. The plurality of holes support flexible members E, which extend through the plates A, B around the shaft ends C.

The stiffness of the flexible joint may be varied by varying the composition or dimensions of the flexible members, by changing the distance between the plates in one shaft end assembly or both shaft end assemblies, by changing the distance between the shaft end assemblies, or a combination of these. The distances may be varied (e.g., manually or by conventional positioning devices including but not limited to hydraulic actuators, cams, and screws, before or after placing the structure on the shaft ends. Because the stiffness can be adjusted while the shaft end assemblies and the flexible members remain in place on the shaft ends, stiffness adjustments can be made not only when the shafts are at rest, but also while the shafts are rotating. The structure of the present invention can adapt readily to changing conditions during operation. The structure also may include an automated system for monitoring the stiffness of the link, comparing it to a predetermined value, and adjusting the stiffness of the link in response to this comparison.

The flexible joint may act as a torsional spring to isolate load and rotation transients, which may adversely affect rotary positioning and/or continued transmission of rotary motion. The stiffness of this torsional spring may be adjusted to suit isolation and load transmission requirements of the power transmission system. The flexible joint may comprise a large number of load-transmitting flexible elements, thereby providing a high level of redundancy and reliability in the event of damage to, or failure of, one or more elements.

The stiffness of the flexible elements, and in turn, the joint, may be varied to enhance vibration isolation resulting from many changes in the displacement of the components on either side of the joint. In addition to providing torsional stiffness (i.e., relative angular displacement around the rotational axis of either side of the joint), the joint also may isolate vibration that occurs as (1) the relative angular displacement as the joint is changed from the co-linear condition of the axes of rotation of the sides of the joint, and (2) the relative linear displacement of the two sides of the joint are changed, either in an axis perpendicular to the rotational axis of either side of the joint or along the rotational axis of either side of the joint.

Also as described in our copending U.S. patent application Ser. No. 10/348,036, the structure of the present invention itself may be capable of movement relative to an enclosure. Contact means are attached to the exterior of the plates, or a frame secured thereto, such that the structure is free to rotate and/or slide within the enclosure. The contact means may be bearings, casters, wheels, or other suitable structures that engage the interior diameter of the enclosure in a way that allows the structure to rotate and/or slide relative to the enclosure. Alternatively, the enclosure may be provided with an interior bearing sleeve that slidably engages the exterior of the support structure.

Figure 2:
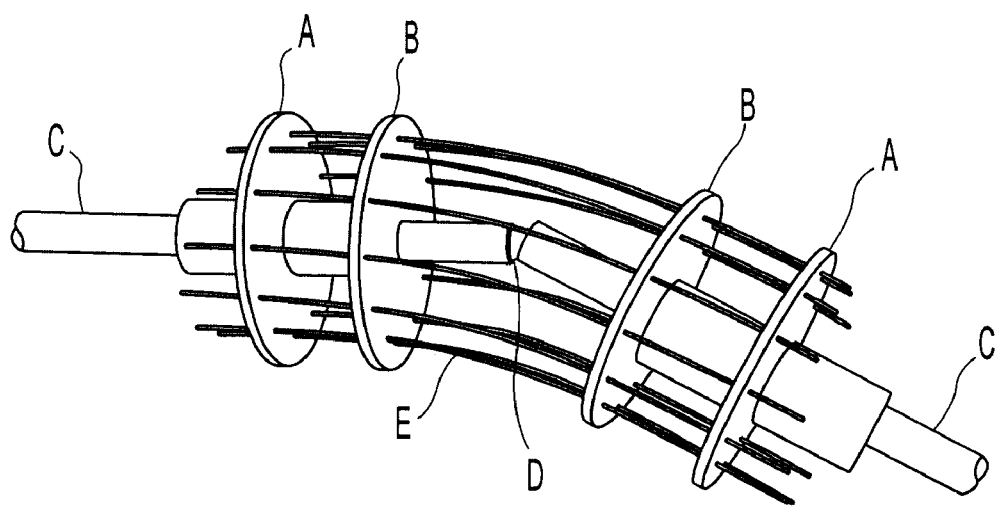
FIG. 2 depicts the structure of FIG. 1 in a deformed position.

In one embodiment of the invention, shown in FIGS. 1 and 2, the structure transmits torque between two rotating shafts (C) that are not collinear but have shaft axes that intersect. The torque is transmitted via flexible elements (E), which are supported through holes formed in the outer support plates (A) and inner support plates (B).

Each of the support plates is adjustable along the axis of its respective shaft (C). The support plates may be fixed from rotating on their respective shafts via set screws (as shown), sliding splines, or other methods known in the art that permit the transmission of torque between the support and the shaft.

The structure may be aligned to assure intersection of the shaft axis via the articulated connection (D). The articulated connection (D) provides alignment and, if required, axial load, along the shafts.

Figure 3:
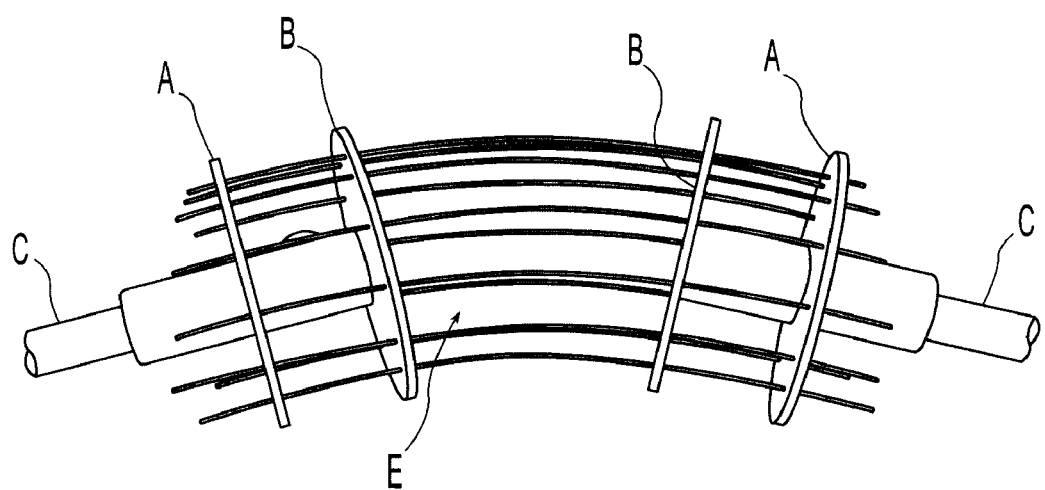
FIG. 3 depicts a structure of the present invention without an articulated connection supporting a pair of shafts angularly displaced from one another.
Figure 4:
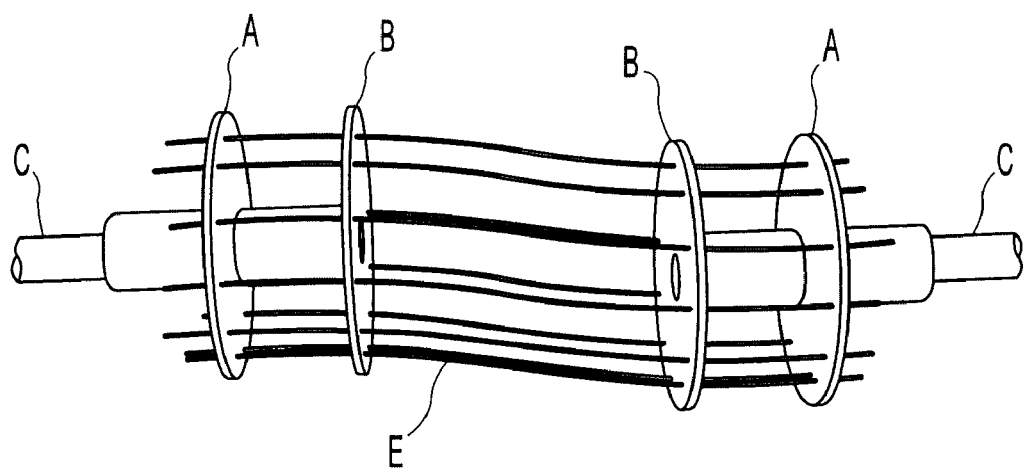
FIG. 4 depicts the structure of FIG. 3 supporting a pair of shafts laterally displaced from one another.
Figure 5:
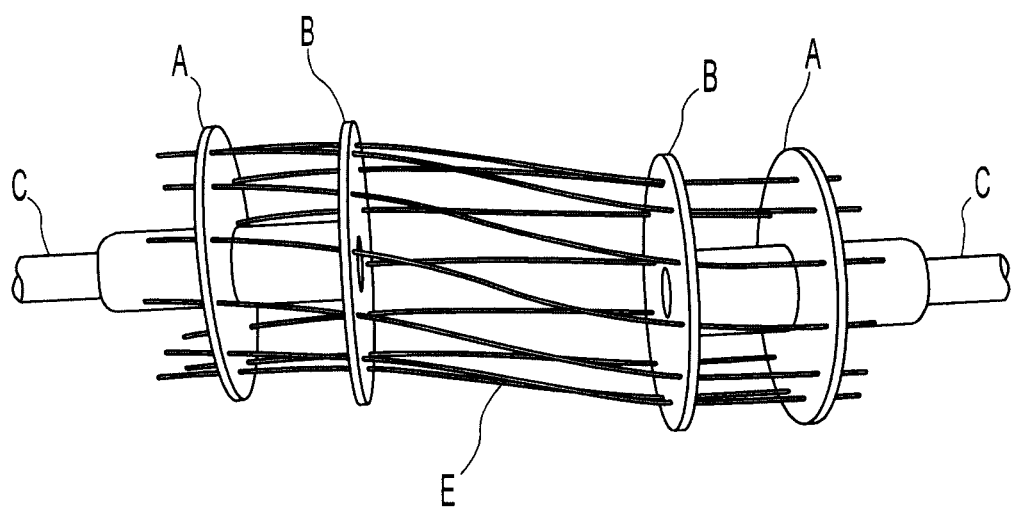
FIG. 5 depicts the structure of FIG. 4 under torsional load.

In another embodiment of the invention, shown in FIGS. 3-5, the structure transmits torque through a connection between two rotating shafts (C) which are not collinear and do not have intersecting axes. The torque is transmitted via flexible elements (E), which are supported through holes in the outer support plates (A) and inner support plates (B).

Each of the support plates is adjustable along the axis of its respective shaft (C). The support plates may be fixed from rotating on their respective shafts via set screws (as shown), sliding splines, or other methods known in the art that permit the transmission of torque between the support and the shaft.

The preferred embodiment of this invention can be achieved by many techniques and methods known to persons who are skilled in this field. To those skilled and knowledgeable in the arts to which the present invention pertains, many widely differing embodiments will be suggested by the foregoing without departing from the intent and scope of the present invention. The descriptions and disclosures herein are intended solely for purposes of illustration and should not be construed as limiting the scope of the present invention.

What is claimed is:

1. A structure for linking rotatable shafts, comprising:
   first and second shaft end assemblies, each shaft end assembly comprising opposing outer and inner plates;
   wherein the outer and inner plates in each shaft end assembly define a central bore for receiving a corresponding shaft end;
   wherein the outer and inner plates in each shaft end assembly are longitudinally spaced apart along the corresponding shaft end;
   a plurality of unitary flexible members, each of the plurality of unitary flexible members extending from the outer and inner plates of the first shaft end assembly to the outer and inner plates of the second shaft end assembly around the shaft ends; and
   wherein the outer and inner plates in each shaft end assembly define a plurality of holes receiving the plurality of unitary flexible members for supporting the plurality of unitary flexible members.

2. The structure of claim 1, wherein the stiffness of the link between the shaft ends may be varied by a method selected from providing flexible members of a different composition, providing flexible members of a different dimension, changing the distance between the outer and inner plates on a shaft end assembly, changing the distance between the first and second shaft end assemblies, and a combination of these.

3. The structure of claim 1, wherein the stiffness of the link between the shaft ends may be varied while the structure is in place on the shaft ends.

4. The structure of claim 3 wherein the stiffness of the link may be varied by a method selected from changing the distance between the outer and inner plates on a shaft end assembly, changing the distance between the first and second shaft end assemblies, and a combination of these.

5. The structure of claim 1, wherein the flexible members transmit torque from one shaft end to the other when the shaft end assemblies are secured to the corresponding shaft ends.

6. The structure of claim 5, wherein the stiffness of the structure may be varied by a method selected from providing flexible members of a different composition, providing flexible members of a different dimension, changing the distance between the outer and inner plates on a shaft end assembly, changing the distance between the first and second shaft end assemblies, and a combination of these.

7. The structure of claim 1, wherein each of the plurality of flexible members extends through a pair of holes in the plates of the first shaft end assembly and a corresponding pair of holes in the plates of the second shaft end assembly.

8. The structure of claim 1, wherein the holes are arranged in a generally circular pattern a fixed distance from the central bore.

9. The structure of claim 1, wherein the plurality of flexible members are arranged in surrounding relationship to the shaft ends.

10. The structure of claim 1, wherein each of the plurality of unitary flexible members has a uniform cross-sectional configuration throughout its length.

11. The structure of claim 10, wherein each of the plurality of unitary flexible members has a circular-shaped cross-sectional configuration.

12. The structure of claim 1, wherein each of the plurality of unitary flexible members is received in the holes of both the outer and inner plates of each of the first and second shaft end assemblies.

13. The structure of claim 12, wherein each of the plurality of unitary flexible members extend entirely through both the outer and inner plates of each of the first and second shaft end assemblies.

14. The structure of claim 1, wherein each of the plurality of unitary flexible members extend entirely through both the outer and inner plates of each of the first and second shaft end assemblies.

15. The structure of claim 1, wherein each of the outer and inner plates of each of the first and second shaft end assemblies are adjustable along the length of the shafts.

16. The structure of claim 15, wherein the plurality of unitary flexible members are longitudinally movable relative to the outer and inner plates of each of the first and second shaft end assemblies.

17. The structure of claim 1, wherein the plurality of unitary flexible members are longitudinally movable relative to the outer and inner plates of each of the first and second shaft end assemblies.

18. The structure of claim 1, wherein the first and second shaft end assemblies are longitudinally movable relative to one another.

19. The structure of claim 1, wherein the first and second shaft end assemblies are connected by an articulated connection.

20. The structure of claim 1, wherein the first and second shaft end assemblies are connected only by the plurality of unitary flexible members.

* * * * *